US008259168B2

(12) United States Patent  (10) Patent No.: US 8,259,168 B2
Wu et al.  (45) Date of Patent: Sep. 4, 2012

(54) OPTICAL FINGERPRINT RECOGNITION SYSTEM

(75) Inventors: Chien-Hsing Wu, Kaohsiung (TW); Jen-Chieh Wu, Pingtung County (TW)

(73) Assignee: Gingy Technology Inc., Hsinchu (TW)

( * ) Notice: Subject to any disclaimer, the term of this patent is extended or adjusted under 35 U.S.C. 154(b) by 0 days.

(21) Appl. No.: 13/010,593

(22) Filed: Jan. 20, 2011

(65) Prior Publication Data

US 2012/0105614 A1  May 3, 2012

(30) Foreign Application Priority Data

Oct. 28, 2010 (KR) .................... 20-2010-0011107 U

(51) Int. Cl.
*H04N 9/47* (2006.01)
*H04N 7/18* (2006.01)
*G06K 9/00* (2006.01)

(52) U.S. Cl. ........... 348/77; 348/128; 382/116; 382/124
(58) Field of Classification Search .......................... None
See application file for complete search history.

(56) References Cited

U.S. PATENT DOCUMENTS

| 5,109,427 | A | * | 4/1992 | Yang ............................. 382/127 |
| 5,177,802 | A |  | 1/1993 | Fujimoto et al. |
| 5,448,649 | A |  | 9/1995 | Chen et al. |
| 5,619,586 | A |  | 4/1997 | Sibbald |
| 5,732,148 | A |  | 3/1998 | Keagy et al. |
| 5,796,858 | A |  | 8/1998 | Zhou et al. |
| 6,069,969 | A |  | 5/2000 | Keagy et al. |
| 6,097,035 | A |  | 8/2000 | Belongie et al. |
| 6,105,869 | A | * | 8/2000 | Scharf et al. ................... 235/454 |
| 6,150,665 | A |  | 11/2000 | Suga |
| 6,154,285 | A | * | 11/2000 | Teng et al. ..................... 356/445 |
| 6,665,427 | B1 |  | 12/2003 | Keagy et al. |
| 6,950,539 | B2 |  | 9/2005 | Bjorn et al. |
| 2002/0150284 | A1 | * | 10/2002 | Iwai .............................. 382/124 |
| 2006/0115128 | A1 | * | 6/2006 | Mainguet ....................... 382/115 |
| 2011/0085336 | A1 | * | 4/2011 | Blumel et al. ................. 362/255 |

* cited by examiner

*Primary Examiner* — Joseph Ustaris
*Assistant Examiner* — Kevin McInnish
(74) *Attorney, Agent, or Firm* — Morris, Manning & Martin, LLP; Tim Tingkang Xia, Esq.

(57) ABSTRACT

An optical fingerprint recognition system has a finger board. The finger board has a plurality of micro-structures, and a plate face of the finger board is to be in contact with a finger, and the other plate face of the finger board has an image capturing element and at least one light emitting element disposed thereon. The image capturing element and the light emitting element are separated from the finger board for a distance. When the light emitting element emits a light ray towards the finger board, the light ray is guided by the plurality of micro-structures to be uniformly distributed in the finger board, so as to facilitate the image capturing element to capture the light ray applied on the finger, thus improving the recognition rate of the fingerprint.

5 Claims, 4 Drawing Sheets

OPTICAL FINGERPRINT RECOGNITION SYSTEM

CROSS-REFERENCE TO RELATED APPLICATIONS

This non-provisional application claims priority under 35 U.S.C. §119(a) on Patent Application No(s). 20-2010-0011107 filed in Korea on Oct. 28, 2010, the entire contents of which are hereby incorporated by reference.

BACKGROUND OF THE INVENTION

1. Field of Invention

The present invention relates to a fingerprint recognition system, and more particularly to an optical fingerprint recognition system having a finger board with a plurality of micro-structures.

2. Related Art

U.S. Pat. No. 5,177,802 mainly includes an image capturing element, a light guide plate disposed above the image capturing element, and two light emitting elements disposed at two sides of the light guide plate. When the light emitting elements emit light, the light guide plate guides the incident light to be projected on a finger and then reflected to the image capturing element according to total reflection principle, thus achieving an effect of fingerprint recognition.

However, the light guide plate guides the incident light according to the total reflection principle, and thus during the process of assembling, the incident angle of the light emitting element and the light guide plate must be precisely adjusted, so as to effectively guide the incident light to be projected to parts of the finger. As a result, the assembling is difficult, and the assembling cost is high, and thus the economical effect is poor.

SUMMARY OF THE INVENTION

Accordingly, the present invention is an optical fingerprint recognition system, which is capable of improving the recognition rate and simplifying the assembling process.

The present invention provides an optical fingerprint recognition system, which is used for recognizing a fingerprint pattern of a finger. The optical fingerprint recognition system comprises a finger board, an image capturing element, and at least one light emitting element. The finger board has a first plate face and a second plate face opposite to each other. The first plate face is used for being contacted by the finger, and the second plate face has a plurality of micro-structures disposed thereon. The image capturing element is separated from the finger board for a distance and is corresponding to the second plate face, and the image capturing element is used for capturing the fingerprint pattern applied on the finger board by the finger. The light emitting element is separated from the finger board for a distance and is corresponding to the second plate face, and the light emitting element emits at least one light ray towards the finger board. When the light emitting element emits a light ray towards the finger board, the light ray enters the finger board along the plurality of micro-structures, such that the light ray is aggregated and uniformly distributed in the finger board. The area of the finger board corresponding to the finger has an enough luminance, so as to get a fingerprint pattern of apparent contrast when the light ray is reflected from the finger to the image capturing element.

The present invention has the efficacy that the micro-structures make the incident light ray to be uniformly distributed in the finger board, so as to facilitate the light ray incident on the finger to be uniform and intensive, thus effectively improving the recognition rate.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

The other technical contents, features, and efficacies of the present invention are illustrated clearly in the detailed description of the several preferred embodiments with reference to accompanying drawings below.

Figure 1:
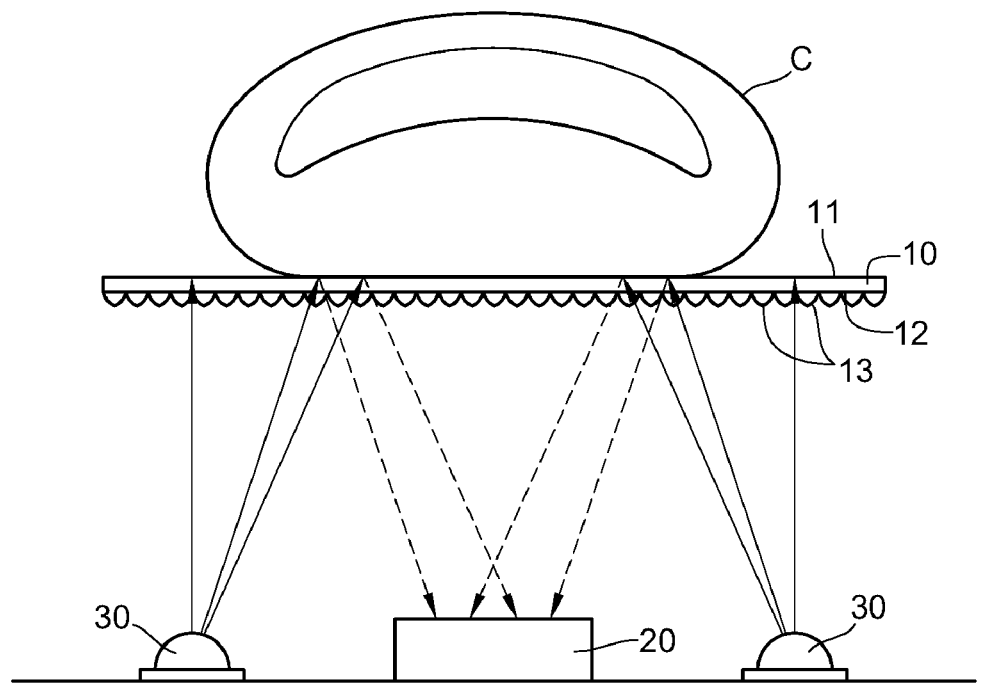
FIG. 1 is a schematic view of a first embodiment of an optical fingerprint recognition system according to the present invention.

FIG. 1 is a schematic view of a firs embodiment of an optical fingerprint recognition system according to the present invention. The optical fingerprint recognition system of the present invention comprises a finger board 10, an image capturing element 20, and at least one light emitting element 30.

The finger board 10 is made of a high-transmissive material, for example, but not limited, made of one of plastics of thermoplastic polyurethane (TPU), polycarbonate (PC), silicone plastics (SP), polymethyl methacrylate (PMMA), and polyethylene terephthalate (PET), as long as the light ray may pass through the finger board 10. Moreover, two opposite sides of the finger board 10 has a first plate face 11 and a second plate face 12 respectively. The first plate face 11 is used for being contacted and pressed by a finger C, and the second plate face 12 has a plurality of micro-structures 13 formed thereon.

Figure 2:
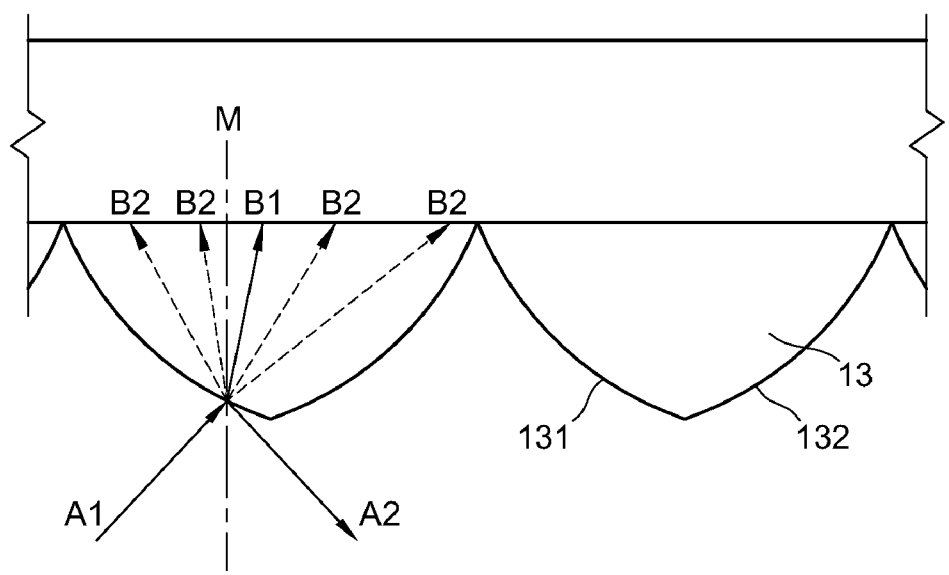
FIG. 2 is an amplified schematic view of simulating an incident light ray entering a finger board from a micro-structure according to the present invention.

FIG. 2 is an amplified schematic view of simulating an incident light ray entering a finger board from a micro-structure according to the present invention. The plurality of micro-structures 13 of the present invention is formed on the surface of the second plate face 12, for example, a plurality of convex micro-structures 13 protruding from the second plate face 12. It should be noted that, a shape of a cross-sectional surface of the micro-structures 13 may be an arc-shaped cone structure formed by a first arc-shaped convex surface 131 and a second arc-shaped convex surface 132.

As shown in FIG. 1, the image capturing element 20 is separated from the finger board 10 for a distance, and is used for capturing the light ray from the finger board 10 and converting the light ray into an electric signal. The image capturing element 20 may be a charge coupled device (CCD) or a complementary metal oxide semiconductor (CMOS) element. In the embodiment of the present invention, the image capturing element 20 is illustrated with a CMOS element as an example, but the present invention is not limited thereto.

The light emitting element 30 is disposed at an adjacent side of the image capturing element 20, and is used for emitting a light ray to irradiate the plurality of micro-structures 13 of the finger board 10. In the embodiment of the present invention, the light emitting element 30 is illustrated with a light emitting diode (LED) as a preferred embodiment, but the present invention is not limited thereto.

With the structure configuration, when a finger C is placed on the first plate face 11 of the finger board 10, the light emitting element 30 is driven to emit a light ray towards the finger board 10, such that the light ray enters the second plate face 12 of the finger board 10 from the plurality of micro-structures 13. As the micro-structures 13 are distributed in the second plate face 12 of the finger board 10, the whole surface of the second plate face 12 has the surface property of a plurality of arc-shaped cone structures. In this manner, the transmission path of the incident light ray emitted by the light emitting element 30 is changed and the incident light ray is scattered through the design of the plurality of micro-structures 13, that is, after the incident light ray enters the micro-structures 13, the incident light ray is uniformly distributed in the finger board 10.

Particularly, as shown in FIG. 2, for example, an incident light ray A1 is incident onto the micro-structures 13 from the air, and a transmitted light ray B1 near to a normal line M and a plurality of scattered light rays B2 are generated, such that the transmitted light ray B1 and the scattered light rays B2 enter the finger board 10 respectively. Furthermore, part of the incident light ray A1 forms a reflected light ray A2 at a surface of the micro-structures 13.

Thus, when a plurality of incident light rays A1 enters the plurality of micro-structures 13 respectively, the incident light rays A1 are split into intensive transmitted light rays B1 and scattered light rays B2 with a large number through the design of the micro-structures 13, such that the whole surface of the finger board 10 receives light uniformly, and the area of the finger board 10 corresponding to the finger C has an enough luminance.

It should be noted that, the effect of refraction my be changed by the depth of the plurality of micro-structures 13, the included angle of plane of infraction, and the density of configuration, and the micro-structures 13 may be suitably configured according to actual requirement, thus obtaining optimal luminance and brightness.

Figure 3A:
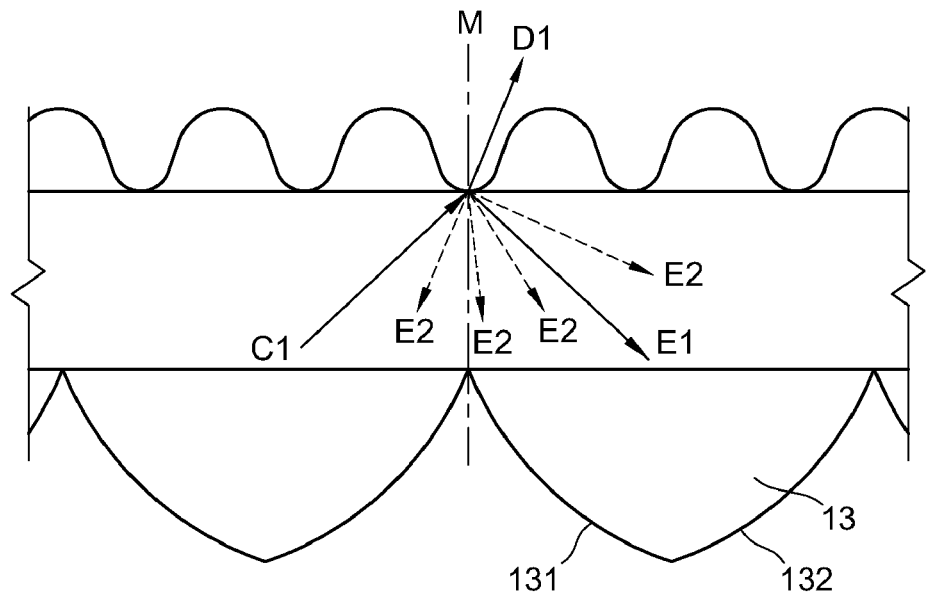
FIG. 3A is an amplified schematic view of simulating a light ray incident on a fingerprint ridge from a finger board according to the present invention.

As shown in FIG. 3A, when the light ray C1 is incident to a ridge of the fingerprint C from the finger board 10, part of the light ray C1 penetrates through the fingerprint ridge to generate a transmitted light ray D1 near to the normal line M. As the surface of the fingerprint ridge is uneven, part of the light ray C1 generates a reflected light ray E1 and a plurality of scattered light rays E2 on a block contacting the ridge. As the light ray C1 enters into the finger C from the finger board 10, no totally reflected light ray is generated, and thus, the light ray C1 is applied at the fingerprint ridge site, and a dark region with weak luminance is formed.

Figure 3B:
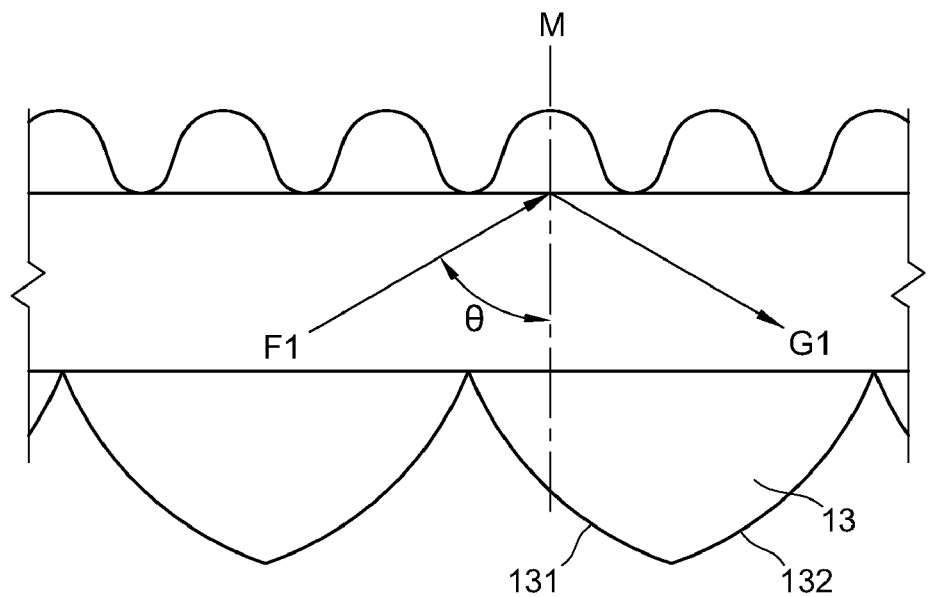
FIG. 3B is a amplified schematic view of simulating a light ray incident on a fingerprint valley from a finger board according to the present invention.

As shown in FIG. 3B, when the light ray F1 is incident to a valley of the fingerprint C from the finger board 10, as the fingerprint valley forms a recess on the finger board 10, that is, the light ray F1 enters the air from the finger board 10, and the surface of the finger board 10 is even, when an incident angle of the light ray F1 is greater than a critical angle θ, a totally reflected light ray G1 is generated. Thus, the light ray C1 is applied at the fingerprint valley, and a bright region with a strong luminance is formed. In this manner, a fingerprint pattern with apparent contrast is formed, such that the image capturing element 20 achieves the effect of fingerprint recognition.

Figure 4:
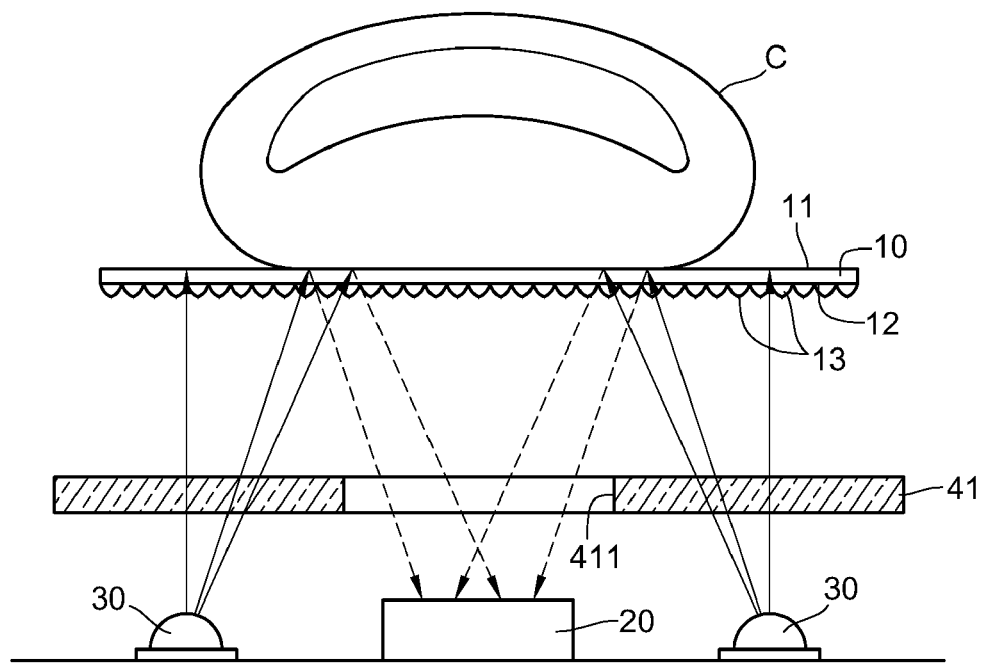
FIG. 4 is a schematic view of a second embodiment of an optical fingerprint recognition system according to the present invention.

FIG. 4 is a schematic view of a second embodiment of an optical fingerprint recognition system according to the present invention. The optical fingerprint recognition system further comprises an optical element. The optical element is a transmissive light diffusion plate 41, and the light diffusion plate 41 is disposed between the finger board 10 and the image capturing element 20. The light diffusion plate 41 has an opening 411, and the opening 411 is opposite to the image capturing element 20.

When the light emitting element 30 emits a light ray towards the light diffusion plate 41, the light ray is converted into a surface light source by the light diffusion plate 41, and the surface light source uniformly overlaps the entire area of the finger board 10, so as to ensure that the surface light source covers the whole surface of the finger board 10. The transmission path of the surface light source is changed by the micro-structures 13 and scattering is generated, thus enhancing the effect of uniform distribution of the light ray, such that the entire region of the finger board 10 is lightened. The light ray is reflected by the finger C, and the reflected light ray enters the image capturing element 20 through the opening 411 of the light diffusion plate 41, thus significantly improving the effect of fingerprint recognition.

Figure 5:
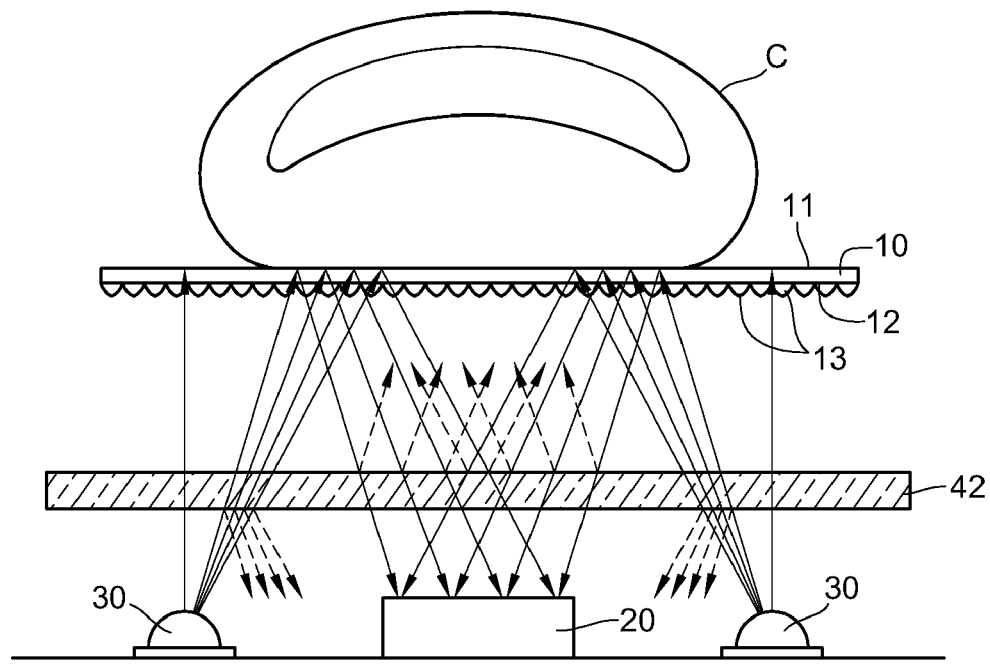
FIG. 5 is a schematic view of a third embodiment of an optical fingerprint recognition system according to the present invention.

FIG. 5 is a schematic view of a third embodiment of an optical fingerprint recognition system according to the present invention. The third embodiment is substantially the same as the second embodiment, so only the differences therebetween are described below. As shown in FIG. 5, the optical element is a light splitter 42, which allows the light ray of specific wavelength to pass through, for example, the light ray having a wavelength of 380 nm-780 nm, but the present invention is not limited thereto. In this embodiment, a ratio of the transmittance to the reflectance of the light splitter 42 is about 80%:20%.

When the light emitting element 30 emits a light ray towards the light splitter 42, 80% light ray transmits the light splitter 42 to form a transmitted light ray. Furthermore, 20% light ray is reflected by the light splitter 42 and cannot be used. That is to say, the light splitter 42 is coated multilayers to achieve the effect of splitting. Thus, the problem of obvious point light source on the finger board 10 generated by the light emitting element 30 is solved.

The plurality of micro-structures 13 has the function of changing the transmission path of the light and generating scattering. Therefore, when the transmitted light ray enters the finger board 10, the plurality of micro-structures 13 guides the transmitted light ray to be uniformly distributed on the finger board 10, and thus the brightness of the entire region of the finger board 10 is uniform.

Furthermore, the light ray reflected by the finger C is applied on the light splitter 42 again, such that the light ray passes through the light splitter 42 again to form a secondary light ray filtering. Thus, the image capturing element 20 captures the apparent contrast fingerprint light ray pattern, so as to significantly improve the effect of recognition fingerprint of the image capturing element 20.

Figure 6:
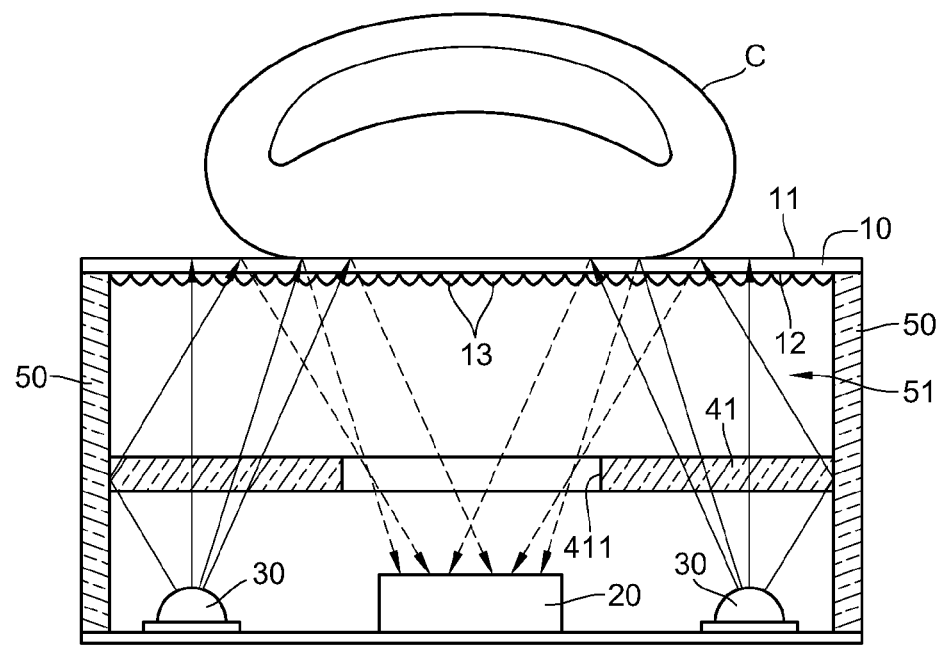
FIG. 6 is a schematic view of a fourth embodiment of an optical fingerprint recognition system according to the present invention.

FIG. 6 is a schematic view of a fourth embodiment of an optical fingerprint recognition system according to the present invention. The optical fingerprint recognition system further comprises at least two light guide elements 50, which are disposed at two opposite sides of the optical element respectively. In this embodiment, the optical element is illustrated with a light diffusion plate 41 as an example, but the present invention is not limited thereto. Next, the finger board 10 is disposed on the top of the light guide elements 50. Thus, the finger board 10, the light diffusion plate 41, and the light guide elements 50 surround and define a cavity 51. When the finger C is placed on the finger board 10, the light emitting element 30 emits a light ray towards the light diffusion plate 41, and due to the design of the structure of the light diffusion plate 41 and the light guide elements 50, the light ray forms a uniform light field in the cavity 51, such that the finger board 10 and the plurality of micro-structures 13 receives light uniformly, thus improving the contrast of the fingerprint pattern of the finger C, such that the fingerprint pattern is clearer and the recognition rate is better.

Figure 7:
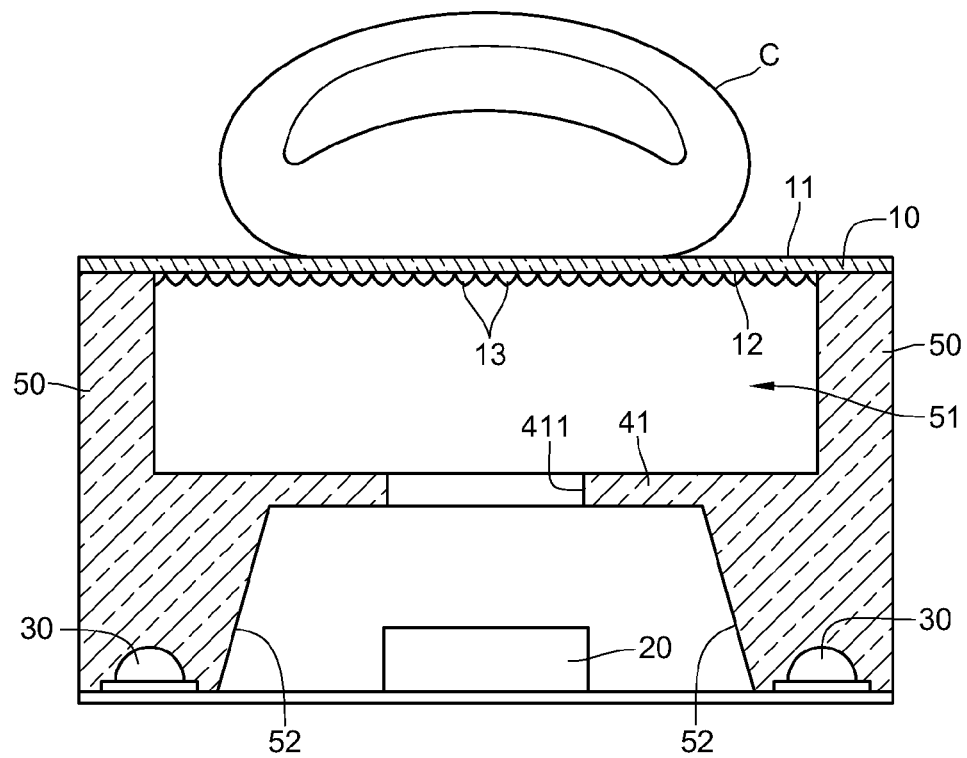
FIG. 7 is schematic view of a fifth embodiment of an optical fingerprint recognition system according to the present invention.

It should be noted that, as shown in FIG. 7, an optical element (for example, the light diffusion plate 41) and the light guide elements 50 may be integrally formed, such that the reflectance of the light ray is consistent, which is helpful to uniformly change the transmission path of the light ray, and the light ray is uniformly distributed on the finger board 10. Furthermore, the light guide element 50 may also cover an outer edge of the light emitting element 30, such that the light emitting element 30 directly emits a light ray towards the light guide element 50, such that the light ray enters the light guide element 50, and then is scattered out by the light guide element 50. For example, the light ray is emitted out to the optical element along the light guide element 50, and the light ray is emitted out along a side wall of the light guide element 50, so as to form a uniform light field in the cavity 51.

Furthermore, the light guide element 50 has a guide chamfer 52, which is tapered inward to the direction of the optical element, such that the guide chamfer 52 is connected to a side edge of the optical element, thus allowing the light ray to enter the optical element easily.

It can be known from the above that, the optical fingerprint recognition system has the following advantages and efficacies.

1. Through disposing the plurality of micro-structures of the present invention, the light ray is uniformly distributed on the finger board to make the light ray irradiated on the finger uniformly and intensively, so as to effectively improve the fingerprint recognition rate, and thus the present invention has practicability in application.

2. According to the above description, the present invention only needs to design the depth of the plurality of micro-structures, the included angle of plane of infraction, and the density of configuration according to the requirements of actual application, the purpose of improving the recognition rate is achieved. Therefore, the installation position and angle of other elements (such as, light emitting element) do not need to be limited, and thus the assembling process is simplified, the cost is reduced, and the convenience of installation is improved.

What is claimed is:

1. An optical fingerprint recognition system, for recognizing a fingerprint pattern of a finger, comprising:
a finger board, having a first plate face and a second plate face, wherein the first plate is opposite to the second plate face, the first plate face is used for being contacted by the finger thereon, the second plate face has a plurality of micro-structures disposed thereon, and each of the micro-structures are an arc-shaped cone structure formed by a first arc-shaped convex surface and a second arc-shaped convex surface;
an image capturing element, separated from the finger board for a distance and corresponding to the second plate face, wherein the image capturing element is used for capturing the fingerprint pattern of the finger;
at least two light emitting elements, separated from the finger board for a distance and corresponding to the second plate face, the at least two light emitting elements disposed on two opposite sides of the image capturing element, wherein the at least two light emitting elements emit at least one light ray towards the finger board;
an optical element, separated from the finger board for a distance and disposed between the finger board and the image capturing element, wherein the optical element has an opening opposite to the image capturing element, and the light ray reflected from the finger passes through the opening and enters the image capturing element; and
at least two light guide elements, disposed on two opposite sides of the optical element respectively, wherein the finger board is disposed at one side edge of the two light guide elements, the finger board, the optical element, and the light guide elements surround to form a cavity, each one of the two light guide elements has a guide chamfer and a recess, the two guide chamfers are connected to the optical element respectively, each guide chamfer is between one of the two light emitting elements and the image capturing element, the two light emitting elements are accommodated in the two recesses respectively, and the two light guide elements cover and contact out edges of the two light emitting elements;
wherein the micro-structures are used for guiding the light ray uniformly distributed in the finger board, such that the light ray is reflected to the image capturing element by the finger, and the image capturing element captures the light ray applied on the finger, so as to recognize the fingerprint pattern of the finger.

2. The optical fingerprint recognition system according to claim 1, wherein the micro-structures protrude from the finger board.

3. The optical fingerprint recognition system according to claim 1, wherein the optical element is a light diffusion plate.

4. The optical fingerprint recognition system according to claim 1, wherein the optical element is a light splitter, and optionally, the light ray with a specific wavelength emitted by the light emitting element is made to pass through the light splitter, or the light ray with a specific wavelength reflected by the finger is made to pass through the light splitter.

5. The optical fingerprint recognition system according to claim 1, wherein the optical element and the two light guide elements are integrally formed.

* * * * *